(12) United States Patent
Machlica et al.

(10) Patent No.: US 10,187,401 B2
(45) Date of Patent: Jan. 22, 2019

(54) HIERARCHICAL FEATURE EXTRACTION FOR MALWARE CLASSIFICATION IN NETWORK TRAFFIC

(71) Applicant: CISCO TECHNOLOGY, INC., San Jose, CA (US)

(72) Inventors: Lukas Machlica, Prague (CZ); Michal Sofka, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 14/934,492

(22) Filed: Nov. 6, 2015

(65) Prior Publication Data

US 2017/0134404 A1    May 11, 2017

(51) Int. Cl.
| | | |
|---|---|---|
| H04L 29/00 | (2006.01) | |
| H04L 29/06 | (2006.01) | |
| H04L 29/08 | (2006.01) | |
| G06F 21/00 | (2013.01) | |

(52) U.S. Cl.
CPC .......... *H04L 63/1416* (2013.01); *G06F 21/00* (2013.01); *H04L 63/145* (2013.01); *H04L 67/02* (2013.01)

(58) Field of Classification Search
CPC ... H04L 63/14; H04L 63/1408; H04L 63/145; H04L 63/1416; G06F 15/16
USPC ........................................................ 726/1–27
See application file for complete search history.

(56) References Cited

U.S. PATENT DOCUMENTS

| | | | |
|---|---|---|---|
| 8,745,760 B2 | 6/2014 | Poulson | |
| 8,763,127 B2 | 6/2014 | Yao et al. | |
| 9,516,039 B1* | 12/2016 | Yen | H04L 63/14 |
| 2009/0013405 A1 | 1/2009 | Schipka | |
| 2011/0283361 A1* | 11/2011 | Perdisci | G06F 21/56 726/24 |
| 2013/0104230 A1* | 4/2013 | Tang | G06F 21/552 726/23 |
| 2015/0128263 A1* | 5/2015 | Raugas | H04L 63/1408 726/23 |

OTHER PUBLICATIONS

Jiang-tao Ren, Xiao-ling Ou, Yi Zhang and Dong-cheng Hu, "Research on network-level traffic pattern recognition," Proceedings. The IEEE 5th International Conference on Intelligent Transportation Systems, Singapore, 2002, pp. 500-504.doi: 10.1109/ITSC.2002.1041268 (Year: 2002).*

(Continued)

*Primary Examiner* — Alexander Lagor
*Assistant Examiner* — Vu V Tran
(74) *Attorney, Agent, or Firm* — Cindy Kaplan

(57) ABSTRACT

In one embodiment, a method includes receiving packet flow data at a feature extraction hierarchy comprising a plurality of levels, each of the levels comprising a set of feature extraction functions, computing a first set of feature vectors for the packet flow data at a first level of the feature extraction hierarchy, inputting the first set of feature vectors from the first level of the feature extraction hierarchy into a second level of the feature extraction hierarchy to compute a second set of feature vectors, and transmitting a final feature vector to a classifier to identify malicious traffic. An apparatus and logic are also disclosed herein.

20 Claims, 8 Drawing Sheets

(56) References Cited

OTHER PUBLICATIONS

S. Ji, S. Choi and D. H. Jeong, "Designing a two-level monitoring method to detect network abnormal behaviors," Proceedings of the 2014 IEEE 15th International Conference on Information Reuse and Integration (IEEE IRI 2014), Redwood City, CA, 2014, pp. 703-709. (Year: 2014).*

C. Wright, F. Monrose, and G. M. Masson: On inferring application protocol behaviors in encrypted network traffic, Journal of Machine Learning, 2006.

* cited by examiner

| | $f_{m\text{-}log}^{(n)}(\cdot)$ | $f_m^{(n)}(\cdot)$ | $f_{max}(\cdot)$ | $f_{sum}(\cdot)$ | $f_{sum\text{-}ux}(\cdot)$ |
|---|---|---|---|---|---|
| $a_{sc\text{-}bytes}$ | x | | | | |
| $a_{cs\text{-}bytes}$ | x | | | | |
| $a_{elapsed\text{-}time}$ | | x | | | |
| $a_{length\text{-}path}$ | | x | | | x |
| $a_{length\text{-}query}$ | | x | | | x |
| $a_{http\text{-}status\text{-}1xx}$ | | | | x | |
| $a_{http\text{-}status\text{-}2xx}$ | | | | x | |
| $a_{http\text{-}status\text{-}3xx}$ | | | | x | |
| $a_{http\text{-}status\text{-}4xx}$ | | | | x | |
| $a_{connect}$ | | | | x | |
| $a_{https}$ | | | | x | |
| $a_{http}$ | | | | x | |
| $a_{domain\text{-}is\text{-}ip}$ | | | | x | |
| $a_{incorrect\text{-}url}$ | | | | x | |
| $a_{user\text{-}agent}$ | | | x | | x |
| $a_{mime\text{-}type}$ | | | x | | x |
| $a_{referrer}$ | | | x | | x |
| $a_{client\text{-}ip}$ | | | x | | |
| $a_{server\text{-}ip}$ | | | x | | |
| $a_{server\text{-}country}$ | | | x | | |
| $a_{top\text{-}lvl\text{-}domain}$ | | | x | | |
| $a_{host\text{-}name}$ | | | x | | |
| $a_{second\text{-}lvl\text{-}domain}$ | | | x | | |
| $a_{autonomous\text{-}system}$ | | | x | | x |

FIGURE 7

HIERARCHICAL FEATURE EXTRACTION FOR MALWARE CLASSIFICATION IN NETWORK TRAFFIC

TECHNICAL FIELD

The present disclosure relates generally to communication networks, and more particularly, to analysis of network traffic for network security.

BACKGROUND

Computer networks are exposed to a variety of different attacks that expose vulnerabilities of computer systems in order to compromise their security. Network traffic transmitted on computer networks may be associated with malicious programs or devices. Network traffic may be analyzed based on packet flow log data ("logs" or "proxy logs") to detect and classify network threats. Features of packet flows may be computed from logs, however, there are a number of difficulties in finding suitable feature extraction methods.

BRIEF DESCRIPTION OF THE FIGURES

FIG. 7 is a table depicting combinations of feature extraction functions and attribute vectors, in accordance with one embodiment.

Corresponding reference characters indicate corresponding parts throughout the several views of the drawings.

DESCRIPTION OF EXAMPLE EMBODIMENTS

Overview

Figure 1:
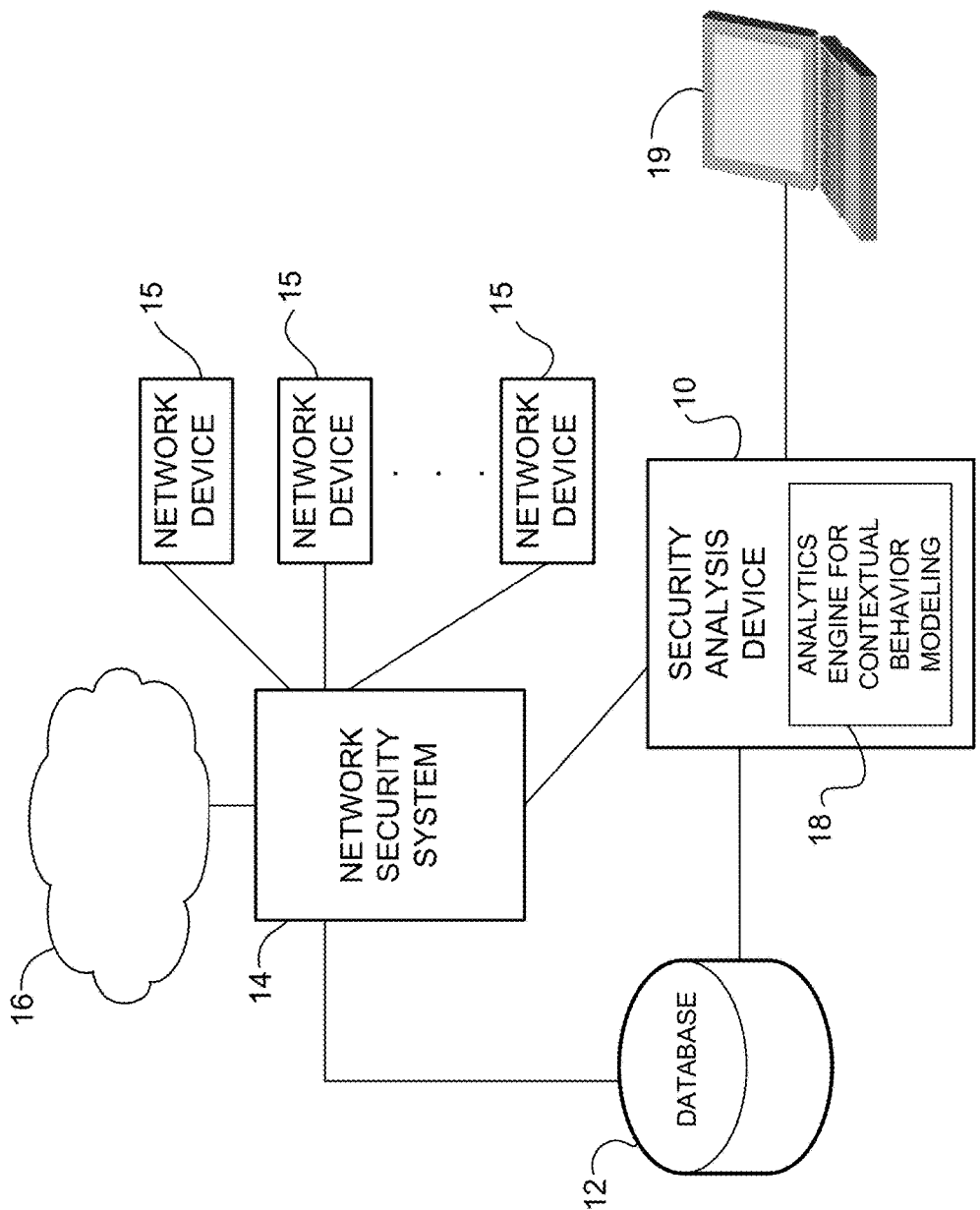
FIG. 1 illustrates an example of a network in which embodiments described herein may be implemented.

In one embodiment, a method generally comprises receiving packet flow data at a feature extraction hierarchy comprising a plurality of levels, each of the levels comprising a set of feature extraction functions, computing a first set of feature vectors for the packet flow data at a first level of the feature extraction hierarchy, inputting the first set of feature vectors from the first level of the feature extraction hierarchy into a second level of the feature extraction hierarchy to compute a second set of feature vectors, and transmitting a final feature vector to a classifier to identify malicious traffic. An apparatus and logic are also disclosed herein.

In another embodiment, an apparatus generally comprises an interface for receiving packet flow data, a processor comprising a feature extraction hierarchy comprising a plurality of levels, each of the levels comprising a set of feature extraction functions, and configured to compute a first set of feature vectors for the packet flow data at a first level of the feature extraction hierarchy, input the first set of feature vectors from the first level of the feature extraction hierarchy into a second level of the feature extraction hierarchy to compute a second set of feature vectors, and input a final feature vector to a classifier to identify malicious traffic. The apparatus further comprises memory for storing the packet flow data.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Network traffic data based on logs (packet flow data) may be analyzed to detect and classify network threats. Approaches based on features computed from proxy log fields generalize well in machine learning frameworks. One difficulty in these approaches is finding suitable feature extraction algorithms along with the definition of input scope of the feature extraction functions and therefore descriptive capability of the resulting features. The features may be extracted based on individual proxy logs, however, this limits the descriptive power as the contextual information provided by related proxy logs is completely ignored. On the other end of the spectrum are techniques that compute statistics over a large window, but use only a small number of features.

The embodiments described herein provide a hierarchical feature extraction architecture that systematically builds features representing traffic behavior. As described in detail below, one or more embodiments use a set of generic feature extraction functions and statistics (e.g., mean, standard deviation, number of elements, maximum value, and statistical moments) as building blocks of the feature hierarchy. The generic nature of the feature extraction functions and the fact that the result may be combined and aggregated in various ways yields a wide range of descriptive features. The features robustly represent traffic behavior, capture contextual information from related proxy log fields (e.g., in the same time window), and cover the unusual cases with anomalous flows or large amounts of legitimate background traffic. In one or more embodiments, processing converts various groups of flows into a numerical representation, which can then be used by a classification or clustering algorithm. This establishes a link between generic features and the classification result, which would be impossible to do manually since various feature relationships and correlations would need to be discovered.

Referring now to the drawings, and first to FIG. 1, an example of a network in which embodiments described herein may be implemented is shown. For simplification only a small number of nodes are shown. The network includes a security analysis device 10, which receives data from a database 12 or network security system 14. The database 12 may include for example, network performance data, number of bytes transferred, URLs (Uniform Resource Locators), IP (Internet Protocol) addresses, HTTP (Hyper Text Transfer Protocol) status, registry access, file system access, or any other data that may be collected by the network security system 14 or other collection device (e.g., gateway, proxy). The network security system 14 may manage security aspects of communications between network devices 15 and untrusted network 16. In the example shown in FIG. 1, the security analysis device 10 is in communication with a computer 19 (e.g., administrator computer) that may be used to retrieve information or reports about security threats.

The network may comprise any number of network devices 15 (e.g., hosts, endpoints, user devices, servers, computers, laptops, tablets, mobile devices, or other devices) in communication via any number of nodes (e.g., routers, switches, controllers, gateways, access layer devices, aggregation layer devices, edge devices, core devices, or other network devices (not shown)), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network). Network traffic may also travel between a main campus and remote branches or any other networks.

The network security system 14 may comprise, for example, a firewall or other device operable to control network traffic by applying a set of rules to traffic, thus limiting traffic flow between trusted network devices 15 and untrusted external network 16. The network security system 14 may also comprise a gateway, proxy, or other network device operable to collect network performance data for traffic exchanged between network devices 15 and external network 16. Network performance data may include information about communications between devices, clients, users, subnetworks, and the like. Network performance data may also include information specific to file transfers initiated by the devices 15, exchanged emails, retransmitted files, registry access, file access, network failures, device failures, and the like. Other data such as bandwidth, throughput, latency, jitter, error rate, and the like may also be collected by the network security system 14. The network security system or other network traffic collection system may also be distributed throughout the network or operate at one or more network devices (e.g., firewall, gateway, proxy, threat prevention appliance, etc.). For example, the network security system may comprise one or more proxy devices operable to collect network traffic data and forward to the security analysis device 10.

The security analysis device 10 may also receive network anomaly data from an Intrusion Detection System (IDS) (anomaly detection system)/Intrusion Prevention System (IPS) located at the network security system 14 or at a separate network device. The IDS may monitor data traffic and determine whether any malicious activities or policy violations occurred in the network. The IDS may be implemented, for example, in a firewall and may execute applications designed to detect malware. Upon detecting such an activity or a violation, the IDS may transmit information to a system administrator or network management station. The IPS may operate to prevent a detected threat from succeeding. The security analysis device 10 may provide information on security threats to the IDS/IPS within the network or located in another network.

The security analysis device 10 may be any computer or network device (e.g., server, controller, appliance, management station, or other processing device or network element) operable to receive network data and, based on the received information, identify features in which an anomaly deviates from other features. The security analysis device 10 may, for example, learn what causes security violations by monitoring and analyzing behavior and events that occur prior to the security violation taking place, in order to prevent such events from occurring in the future.

The security analysis device 10 may comprise logic operable to analyze network data using various techniques. The network data may comprise packet flow log data or files (referred to herein as "logs" or "proxy logs"). The logs may contain packet flow data that may be received from various network devices (e.g., network security system 14, database 12, or other network devices). The imported log files may be analyzed to determine flow features before or after storing the packet flow data at database 12 or security analysis device 10.

The term "packet flow data" as used herein may refer to data (logs, proxy logs) that describes packet flow information or is derived from packet flow information and may comprise, for example, a five-tuple or other set of values that are common to all packets that are related in a flow (e.g., source address, destination address, source port, destination port, and protocol value, or any combination of these or other identifiers).

The database 12 may be a central storage device or a distributed storage system. The database 12 may also be located at the security analysis device 10. The database 12 may have a particular database schema or comprise a file system with one or more structured data files that may have various formats or schemas. For example, database 12 may store packet flow data in log files or any other format.

In one embodiment, the security analysis device 10 includes an analytics engine 18 configured to process data received from the database 12, network security system 14, or any other network device (e.g., firewall, gateway, proxy). Contextual information may be extracted from user network traffic to classify malware behavior. In certain embodiments, communication-specific fingerprints are extracted from proxy logs collected in a given time window and used to perform classification of the traffic.

As described in detail below, the analytics engine 18 comprises a hierarchical feature extraction architecture for systematically building statistical features that are computed from network traffic (e.g., HTTP traffic) and represent traffic behavior. A set of generic feature extraction functions and statistics may be used as building blocks of the feature hierarchy. The security analysis device 10 processes the data to compute generic features across multiple levels of the hierarchy. The feature extraction hierarchy may comprise any number of levels (e.g., 2, 3, 4, 5, . . . ). At a first level of the hierarchy, the features are computed for a selected set of flows (e.g., all flows for a user accessing one domain, computed for all domains accessed by the user). At the subsequent feature extraction levels, the functions take as input results computed from the previous level. The final fingerprint (feature vector) characterizes properties of malicious traffic to differentiate it from legitimate traffic and can be used as input to a classifier.

The terms "malicious traffic" or "malware" as used herein may refer to any malicious network traffic or security threat (e.g., program, application, software, or other executable instructions or code).

It is to be understood that the network shown in FIG. 1 and described above is only an example and that the embodiments described herein may be implemented in networks having different network topologies or network devices, without departing from the scope of the embodiments. For example, the analytics engine 18 may be installed in any computer operable to receive data from one or more sources and extract contextual information to classify malware behavior.

Figure 2:
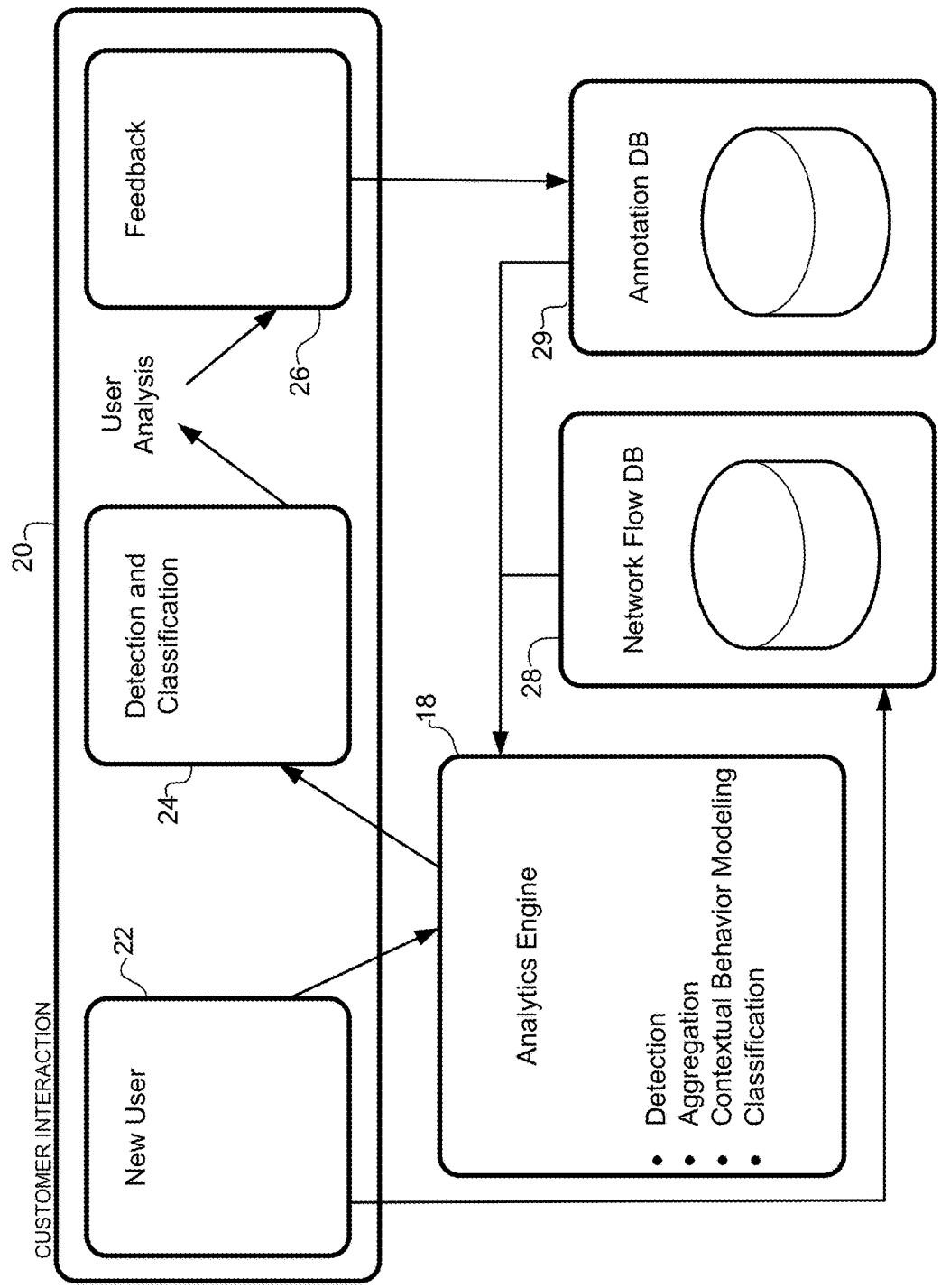
FIG. 2 illustrates an example of a platform for behavior analysis with the analytics engine shown in the network of FIG. 1.

FIG. 2 is a block diagram illustrating the flow of information between the analytics engine 18 and other network components in a data-driven learning platform for behavioral analysis, in accordance with one embodiment. In one example, the analytics engine 18 comprises components operable for anomaly detection, flow aggregation, behavior modeling, and classification. For example, the analytics engine 18 may be operable to analyze received packet flows to extract flow features (e.g., related to URL, flow duration, number of bytes transferred from client to server or server to client, content type of packet flow, HTTP status, etc.). Packet flows may be combined and aggregated in various ways based on various criteria (e.g., time periods, origin devices, events, or any combination thereof) to yield a wide range of descriptive features. The features represent traffic behavior and may be used to classify malicious traffic (e.g., malware behavior). The classifications may include threat levels (e.g., malicious, fault, possible policy violation, warning, legitimate, OK).

Components within block 20 indicate customer interaction, which may include for example, user input 22, detection and classification 24, and feedback 26. User data is transmitted to a network flow database 28 and provided to the analytics engine 18. The analytics engine 18 may also receive data directly from user 22 and provide output to the detection and classification device 24. An annotation database 29 may receive feedback from the customer and also provide data to the analytics engine 18.

It is to be understood that that the components and flow shown in FIG. 2 is only an example, and that the embodiments described herein may utilize and interact with different components, without departing from the scope of the embodiments.

Figure 3:
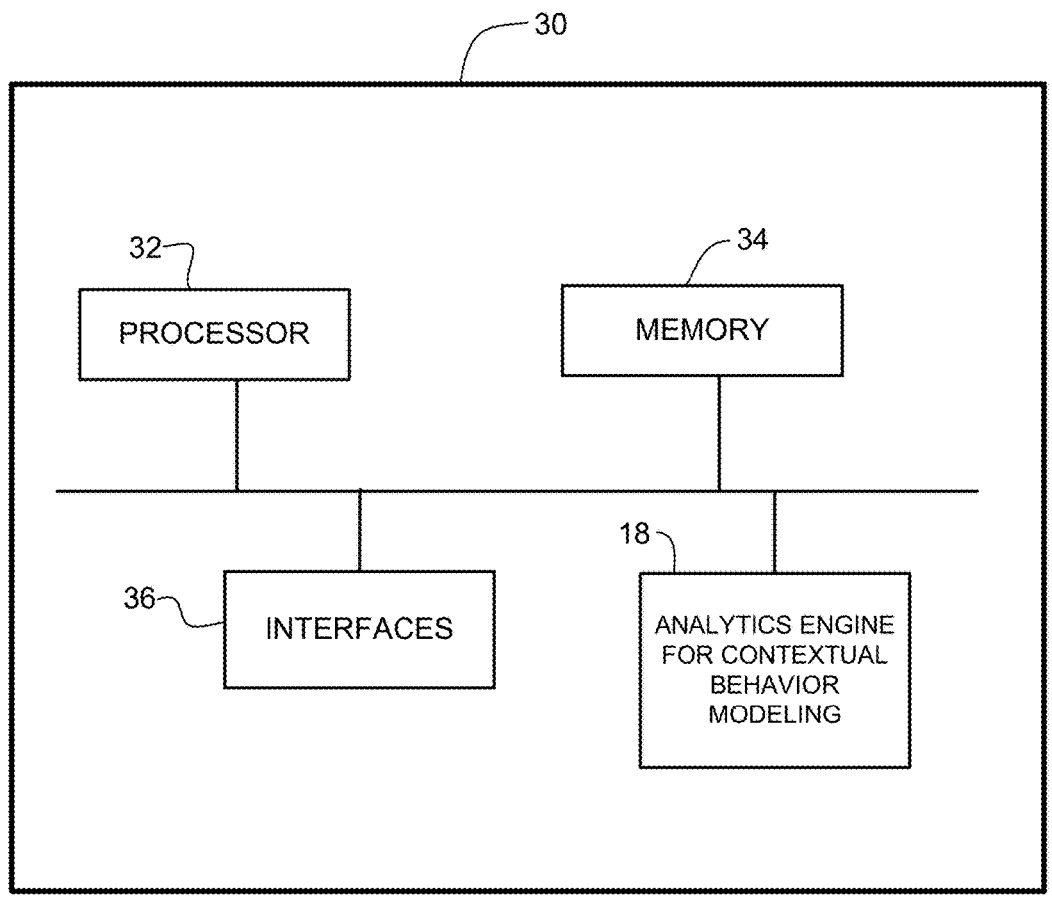
FIG. 3 depicts an example of a network device useful in implementing embodiments described herein.

FIG. 3 is a block diagram illustrating an example of a network device (computer, computing device) 30 (e.g., security analysis device 10 in FIG. 1) that may be used to implement embodiments described herein. The network device 30 is a programmable machine that may be implemented in hardware, software, or any combination thereof. The network device 30 includes a processor 32, memory 34, interfaces 36, and the analytics engine 18 (e.g., software, firmware, code, logic). Memory 34 may be a volatile memory or non-volatile storage, which stores various applications, modules, and data for execution and use by the processor 32. Memory 34 may store, for example, one or more components of the analytics engine 18.

Logic may be encoded in one or more tangible computer readable media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interfaces 36 may comprise any number of interfaces (linecards, ports) for receiving data or transmitting data to other devices. The network interface 36 may include, for example, an Ethernet interface for connection to a computer or network. The network interfaces 36 may be configured to transmit or receive data using a variety of different communication protocols. The interfaces 36 may include mechanical, electrical, and signaling circuitry for communicating data over physical links coupled to the network.

It is to be understood that the network device 30 shown in FIG. 3 and described above is only an example and that different configurations of network devices may be used. For example, the network device 30 may further include any suitable combination of hardware, software, algorithms, processors, devices, components, modules, or elements operable to facilitate the capabilities described herein.

Figure 4:
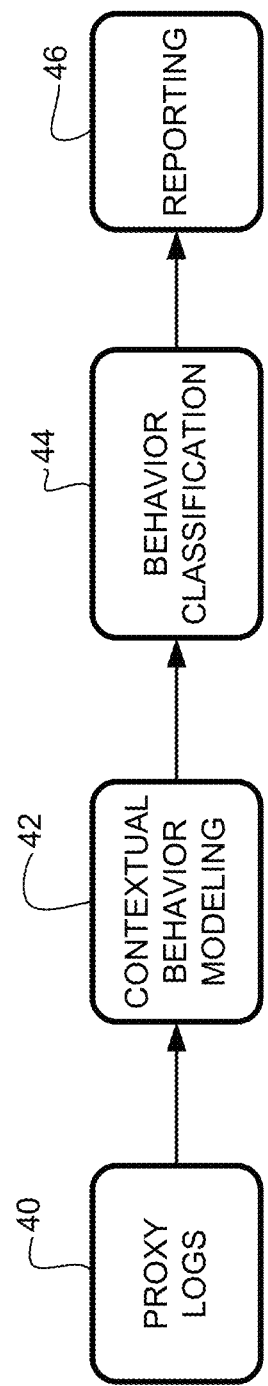
FIG. 4 illustrates an overview of a process flow for analyzing network traffic.

FIG. 4 illustrates an overview of a process flow for malware classification, in accordance with one embodiment. Proxy logs are collected at 40, as previously described. A company may generate any number of proxy logs (e.g., 400 million or more or less per day). Contextual behavior modeling for anomaly detection is then performed on the proxy logs at 42. Any number of anomalies may be identified (e.g., 40 million of 400 million proxy logs collected marked as anomalous). Behavior classification is performed at 44, followed by reporting at 46 of the malicious site, source, address, or connection. Classifications of packet flow data may be reported, for example, to one or more computer display devices. Classifications may be reported for any level of aggregation from a single packet flow to a network incident. The reports may assist in the analysis of classification and understanding of classification of previously undetected malware. Additional details of the process flow shown in FIG. 4 are described below with respect to FIG. 5.

Figure 5:
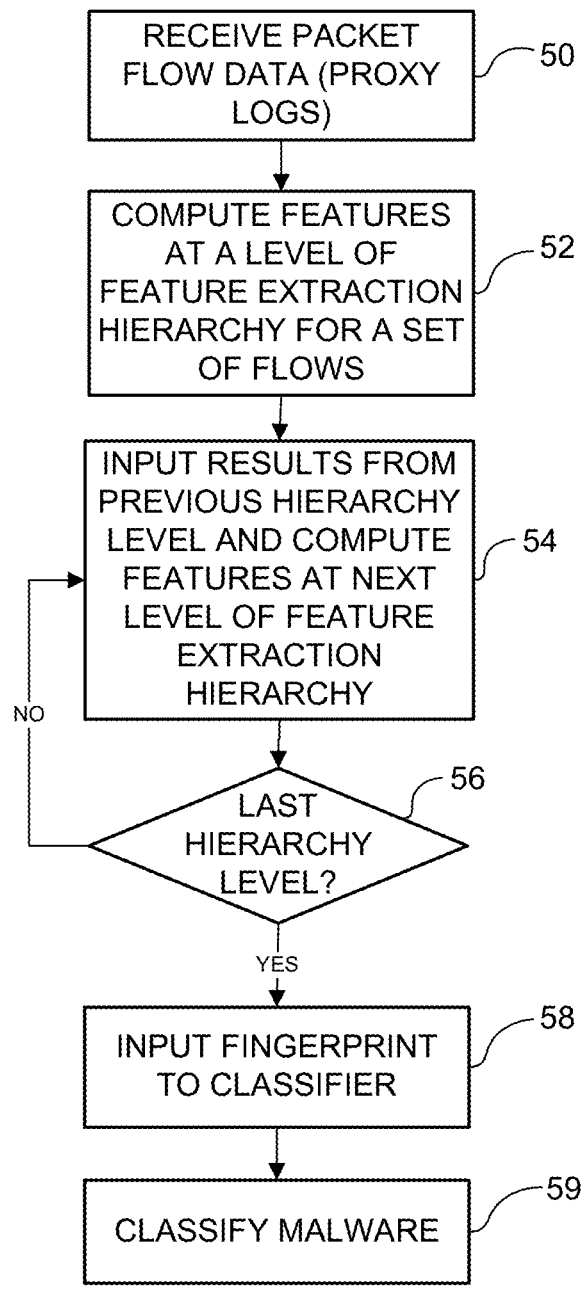
FIG. 5 is a flowchart illustrating a process for contextual behavior modeling for malware classification, in accordance with one embodiment.

FIG. 5 is a flowchart illustrating a process for contextual behavior modeling for malware classification, in accordance with one embodiment. At step 50 packet flow data is received at a computing device (e.g., security analysis device 10 in FIG. 1) with a feature extraction hierarchy comprising a plurality of levels, each level comprising a set of feature extraction functions. The device 10 computes features (e.g., a set of feature vectors, one feature vector per extraction function) at a first level of the feature extraction hierarchy for a set of flows (step 52). At subsequent feature extraction levels, the functions take as input results computed from the previous level (step 54). For example, the first level may compute, for each user, average number of bytes transferred from client to server using all flows to a particular domain. The second level may then compute the average number of transferred bytes for all domains for a particular user. The first level uses various proxy log attributes and subsequent levels use different combinations of results from the previous levels. If there are additional hierarchy levels (step 56), the process continues at step 54 for each level. If this is the last feature extraction level, a final feature vector is generated, which represents a fingerprint of the input set of proxy logs and may be input to a classifier (step 58) to classify malicious traffic (step 59). As described below, multiple feature vectors (fingerprints) may be extracted at the last level of the hierarchy (e.g., one fingerprint per user-domain pair).

It is to be understood that the process illustrated in FIG. 5 and described above is only an example and that steps may be added, removed, or modified, without departing from the scope of the embodiments. Also, it may be noted that the processor 32 or the analytics engine 18 shown in FIG. 3 (or a combination thereof) may implement one or more of the steps shown in FIG. 5 and described herein. For example, logic encoded on a computer readable media and executed by the processor 32 may be operable to perform one or more steps shown in FIG. 5 and described above.

Figure 6:
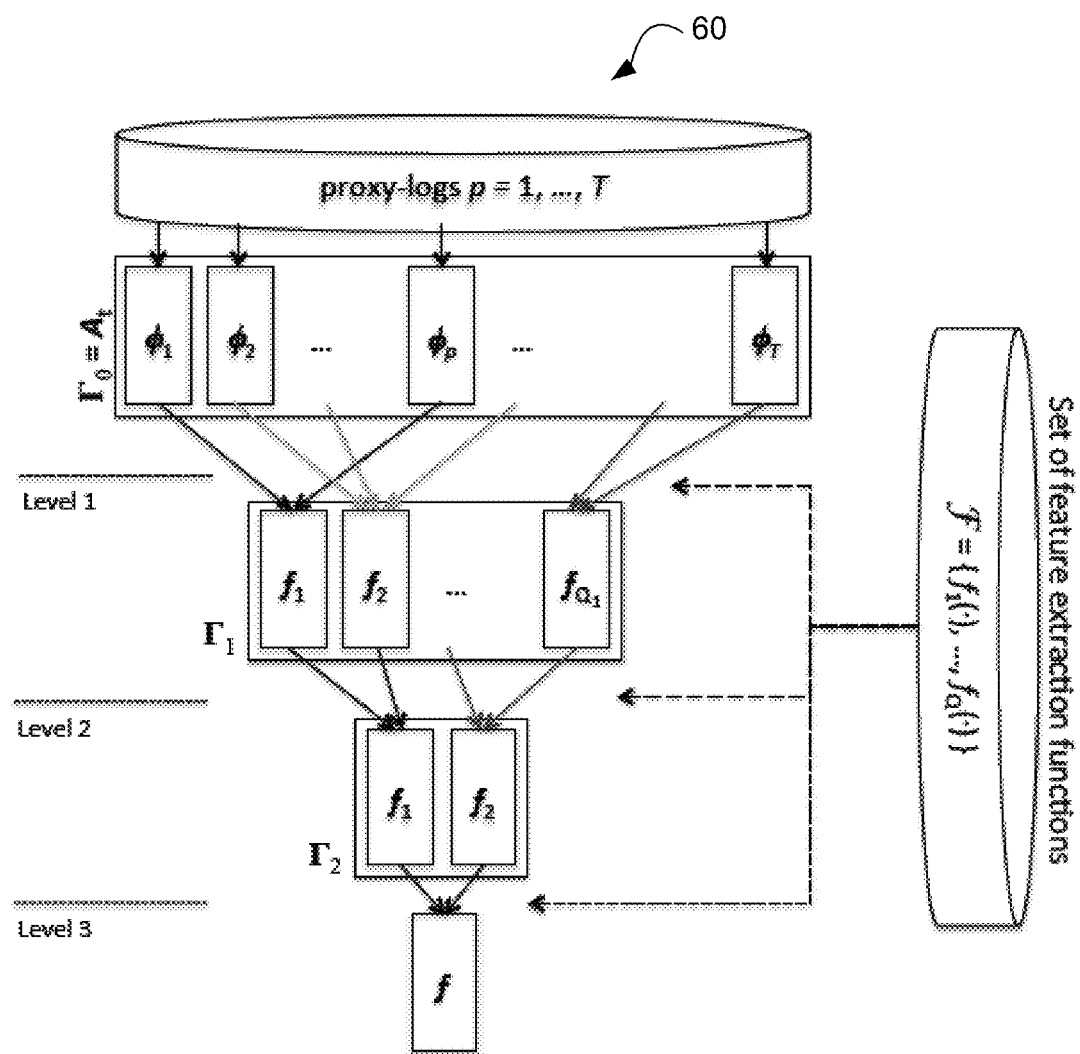
FIG. 6 illustrates an example of a hierarchical feature extraction architecture for use in the process shown of FIG. 5.

As noted above, the embodiments described herein rely on a set of generic feature extraction functions and statistics (e.g., mean, standard deviation, number of elements, maximum value, and statistical moments) as building blocks of the feature extraction hierarchy. FIG. 6 illustrates an example utilizing three levels of feature extraction in hierarchical feature extraction architecture 60. At first, a data matrix $A_t$ with attribute vectors $\phi_p$ is extracted. Then a subset $\tilde{\mathcal{F}}$ of feature extraction functions is chosen at each level and each extraction function is applied to a different set of attribute vectors producing a new feature vector on the next level. At the last level, one specific feature extraction function is chosen and its output is one fingerprint of the input set of proxy logs. The matrix and vector functions are described in detail below, following an overview of the notation used herein.

In the following description, bold lower case letters are used to denote vectors and ordinary lower case letters with a subscript are used to denote elements of that vector (e.g., $a=[a_1, \ldots, a_N]$). Italic upper case letters will in most of the cases denote number of elements in a set/vector/matrix (e.g., N, K, L, Q). Each vector is treated as a column unless stated otherwise. Bold upper case letters are used to denote matrices. For example, $A=[a_1, \ldots, a_K]$ is a matrix composed of column vectors $a_k$, $k=1, \ldots, K$ in its columns. Functions are written in the form $f_j = f_j(X)$, which is a j-th vector function that takes X as its input and outputs a vector $f_j$. It is a mapping that maps a matrix to a vector of real values $f_j \in \mathcal{R}^D$, and D is the dimension of $f_j$. The symbol $f_j(\bullet)$ is used when discussing the function and $f_j$ is used when referring to the output feature vector. The notation $\mathcal{F} = \{f_1(\bullet), \ldots, f_Q(\bullet)\}$ is used to denote a set of Q functions.

In the following example, $\phi_p = [a_{p1}, a_{p2}, \ldots, a_{pN}]^T$ is an N-dimensional column vector of attributes $a_{pi}$ representing the proxy log p. For example, $a_{p1}$ may be a number of bytes transferred from client to the server, $a_{p2}$ the http status, $a_{p3}$ the length of the URL path in proxy log p and so on. Let $$A_t = [\phi_1, \phi_2, \ldots, \phi_T] \quad (1)$$

be a data matrix of size N×T with columns given by attribute vectors $\phi_p$, where T is the number of proxy logs in the time window t. The data matrix may also be written as:

$$A_t^T = [a_1, a_2, \ldots, a_N], \quad (2)$$

where $a_i = [a_{1i}, a_{2i}, \ldots, a_{Ti}]$ is the i-th row of $A_t$. It is a column vector of values for the same type of attribute across all proxy logs from time window t.

$$f_j = f_j(A_t, i) = \frac{1}{T}(e_i^T A_t)\mathbf{1} = \frac{1}{T}a_i^T\mathbf{1} = \frac{1}{T}\sum_{p=1}^{T} a_{pi}, \quad (3)$$

where $e_i$ is a column vector of zeros with 1 in its i-th entry. It is used to pick the i-th row of $A_t$ (i.e., $a_i = A_t^T e_i$). The vector 1 composed of ones is used to aggregate values in the row. For example, if $a_{p1}$ were the number of bytes transferred from client to server given in proxy log p, the function (3) with i=1 would estimate the mean value of transferred bytes in the time window t.

The following describes a hierarchical feature extraction architecture that may be used to compute a single feature vector to represent the entire traffic of all users in each time window t. For example, consider a time window with a user communicating with multiple domains, but with a majority of traffic to only one domain. In this example, the attribute $a_{p1}$ is the number of transferred bytes from client to server. The feature extraction function computes the standard deviation of the transferred bytes. If all flows in the time window were used to estimate the standard deviation, the extracted statistic would be skewed; it would mostly characterize the communication with the domain having the majority of flows. To make this computation more robust, the feature extraction function is applied separately for flows to each domain. The aggregated result is then obtained at the next hierarchical level (e.g., by using summation across domains to get the final feature vector). In this example, the entire procedure essentially assigns weights to different aspects of the communication in a given time window. This helps in the frequent case when the malware generates sizable traffic to legitimate sites to obfuscate communication with the command and control server. A general description of the extraction procedure, in accordance with one embodiment, is given in the hierarchical extraction algorithm below and an example case is depicted in FIG. 6. The choice of extraction functions and vector subsets on each level may be based on expert knowledge.

In this example, the hierarchical extraction algorithm uses as input a set of Q feature extraction functions $\mathcal{F} = \{f_1(\bullet), f_2(\bullet), \ldots, f_Q(\bullet)\}$, number of extraction levels L, and matrix $A_t$ composed of attribute column vectors, one for each proxy log in a time window t (c.f. Eq. (1) above).

1. Initialization: $\Gamma_0 = A_t$
2. for l = 1 to L − 1 do
3.     choose a subset of extraction functions $\tilde{\mathcal{F}} \subset \mathcal{F}$
4.     for each $f_q(\cdot) \in \tilde{\mathcal{F}}$ do
5.         select input vectors as a subset of columns from $\Gamma_{l-1}$ to form $\tilde{\Gamma}_{l-1}$
6.         extract feature vector $f_q = f_q(\tilde{\Gamma}_{l-1})$
7.     end for
8.     construct a new data matrix $\Gamma_l = [f_1, \ldots, f_q, \ldots, f_{Q_l}]$, where $Q_l$ is the number of (column) feature vectors extracted at the level l
9. end for
10. choose the final feature extraction function, $f_k(\cdot)$, and extract the fingerprint $f_k = f_k(\Gamma_{L-1})$ using all input vectors from $\Gamma_{L-1}$
11. return $f_k$ as the fingerprint for the traffic in a time window t

60

Now, let $f_j = f_j(X)$, $f_j : \mathcal{R}^{N \times T} \mapsto \mathcal{R}^D$ be a feature extraction function that takes as an input a data matrix X and outputs a D dimensional vector $f_j = [f_1, \ldots, f_D]$. For example, a feature extraction function may compute the mean value of elements in the i-th row of $A_t$:

To illustrate an example, only one attribute, $a_{p1}$, representing the number of byes transferred from server to client is used. Let $\phi_{(u,d),p} = [a_{p1}]$ be a one dimensional attribute vector for proxy log p of a user u to domain d, and $\mathcal{F} = \{s(\bullet), m(\bullet)\}$ be the set of feature extraction functions, where $s(\bullet)$ computes the standard deviation and m(•) computes the mean value. A three level extraction problem may be computed as follows:

L0: Initialization level. Construct matrices representing the traffic of user u to domain d in the given time window:

$$\Gamma_{(u,d)} = A_{(u,d)} = [\phi_{(u,d),1}, \ldots, \phi_{(u,d),P}],$$

where P is the number of flows of user u to domain d.

L1: Estimate the standard deviation of transferred bytes to domain d for user u:

$$f_{(u,d)} = s(\Gamma_{(u,d)}),$$

Construct new data matrix $\Gamma_u = [f_{(u,1)}, \ldots, f_{(u,D)}]$ that represents the communication of user u.

L2: compute the mean value of all features (standard deviations) from one user to get a representation of flows from a user perspective:

$$f_u = m(\Gamma_u). \quad (4)$$

This is the average fluctuation of bytes computed for each user u=1, ..., U, where U is the overall number of users in the time window. Define a new data matrix $\Gamma = [f_1, \ldots, f_U]$.

L3: compute the mean of all vectors from $\Gamma$ to get the final fingerprint of the whole time window:

$$f = m(\Gamma) \quad (5)$$

Several other levels may be added to the above example to obtain a more detailed transition from one set of features to the other. For example, the statistics on the first level may be extracted from all flows of a user u with a specific URL n to a domain d. This would provide a four level extraction with $f_{(u,d,n)}$ and $\Gamma_{(u,d)} = [f_{(u,d,1)}, \ldots, f_{(u,d,N)}]$ on the first level. Another option is to stop the extraction process at any level and obtain multiple fingerprints for one time window (e.g., one fingerprint per user).

It is to be understood that the above is only an example and that functions other than mean and standard deviation may also be used, without departing from the scope of the embodiments.

The choice of features is important because they define the representation that is then used by the classifier. The features should be representative to accurately represent various aspects of the communication. More importantly, they should be discriminative to robustly differentiate between malicious and legitimate samples. Finally, the features should not be too specific (e.g., name of a domain) so that the classifier generalizes well to new (previously unseen) traffic while maintaining a low false positive rate.

The feature extraction functions that are described herein may operate on the rows of the data matrix A as defined in equation (1) above. In the following description subscripts are used to indicate the type of attribute the row vector $a_i$ refers to. For example, instead of $a_3$, the term $a_{referrer}$ will be used to indicate that the row is related to features representing the referrer.

The following are definitions for examples of attribute vectors:

$a_{sc-bytes}$—each entry gives the number of bytes transferred from server to client $a_{cs-bytes}$—each entry gives the number of bytes transferred from client to server $a_{elapsed-time}$—each entry gives inter arrival time of a proxy log $a_{length-path}$—each entry gives the length of path string in the URL $a_{length\ query}$—each entry gives the length of query string in the URL $a_{http-status-1xx}$—entry is 1 if http-status of the proxy log is informational (1xx status class), and is 0 otherwise $a_{http-status-2xx}$—entry is 1 if http-status of the proxy log indicates success (2xx status class), and is 0 otherwise $a_{http-status-3xx}$—entry is 1 if http-status of the proxy log implies redirection (3xx status class), and is 0 otherwise $a_{http-status-4xx}$—entry is 1 if http-status of the proxy log indicates client error (4xx status class), and is 0 otherwise $a_{connect}$—entry is 1 if URL of the proxy log begins with connect://, and is 0 otherwise $a_{https}$—entry is 1 if URL of the proxy log begins with https://, and is 0 otherwise $a_{http}$—entry is 1 if URL of the proxy log begins with http://, and is 0 otherwise $a_{domain-is-ip}$—entry is 1 if the domain of the proxy log is given by IP, and is 0 otherwise $a_{incorrect-url}$—entry is 1 if the URL in the proxy log cannot be parsed because of a syntax error (e.g.: "http://domainXhttp://domainX/index"), and is 0 otherwise In one embodiment, in order to represent string features, the following procedure is used. Given a set of strings $S = \{s_1, s_2, \ldots, s_N\}$, unique strings (excluding empty strings) are identified and a new set (codebook) is formed containing only the unique strings $S_{unq} = \{s_1^{unq}, s_2^{unq}, \ldots, s_K^{unq}\}$ where $K \leq N$ is the number of unique strings. Each string from the set S is represented by the position index of the same string in the codebook $S_{unq}$ and if the string is empty the corresponding entry is 0. For example, if $S = \{$".com", " ", ".net", ".com", ".org"$\}$ and $S_{unq} = \{$".com", ".net", ".org"$\}$, then the vector representation of S is $a_s = [1, 0, 2, 1, 3]$. Such representations can be easily used to identify the number of unique elements in the set (max value of $a_s$) or to count number of missing values (count of zero elements) as is shown below. These representations are extracted for the following proxy log fields:

$a_{user-agent}$, $a_{mime-type}$, $a_{referrer}$, $a_{client-ip}$, $a_{server-ip}$, $a_{server-country}$, $a_{autonomous\ system}$, $a_{host-name}$, $a_{top-lvl-domain}$, $a_{second-lvl-domain}$ Given a vector $a = [a_1, \ldots, a_T]$ the following feature extraction functions may be used:

$f_{m-log}^{(n)} = M^{(n)}(\log_2(a))$—binary logarithm of each entry of the input vector a is computed first, and then the n-th statistical moment from all entries of a is estimated $f_m^{(n)} = M_{(n)}^{(a)}$—similar to $f_{m-log}^{(n)}$, but no logarithm is computed on the entries of a $f_{max} = \max_{p=1,\ldots,T} a_p$—maximum value from a $f_{sum} = \sum_{p=1}^{T} a_p$—sum of all elements of a $f_{sum-nz} = \sum_{p=1}^{T} \delta_0(a_p)$, where $\delta_0(a_p) = 0$ if $a_p = 0$ and 1 otherwise—numbers of nonzero entries of a Practical combinations of attribute vectors a and feature extraction functions are given in table 70 of FIG. 7. Table 70 depicts combinations of feature extraction functions and attribute vectors, in accordance with one embodiment. For $f_{m-log}(n)$ and $f_m(n)$ the first 4 moments n=1, ..., 4 are extracted. For example, $f_{m-log}^{(n)}(a_{SC-bytes})$, n=1, ..., 4 outputs the first four moments of bytes transferred from server to client, $f_{sum-nz}(a_{length-query})$ outputs the number of proxy logs, which contain query, and $f_{max}(a_{user-agent})$ outputs the number of unique user agents.

In this example, 45 features are extracted, which represent the communication in a given time window without any pattern matching of domain/path/query strings of URLs. These features can be computed from any given input set of proxy logs (e.g., set of flows from one user and/or to a specific server IP address and/or to one domain with a given URL).

It may be noted that some features are not informative in the classification setup and can introduce ambiguity between the classes. These features may be removed from the classification manually by applying expert knowledge or through automatic feature selection algorithms. Various methods to find an appropriate set of features (feature vectors) given suitable criteria may be used, as is well known by those skilled in the art. A criterion (e.g., density of samples of the same class in a cluster) should be as high as possible, and the algorithm will discard features that would lower the density.

Figure 8:
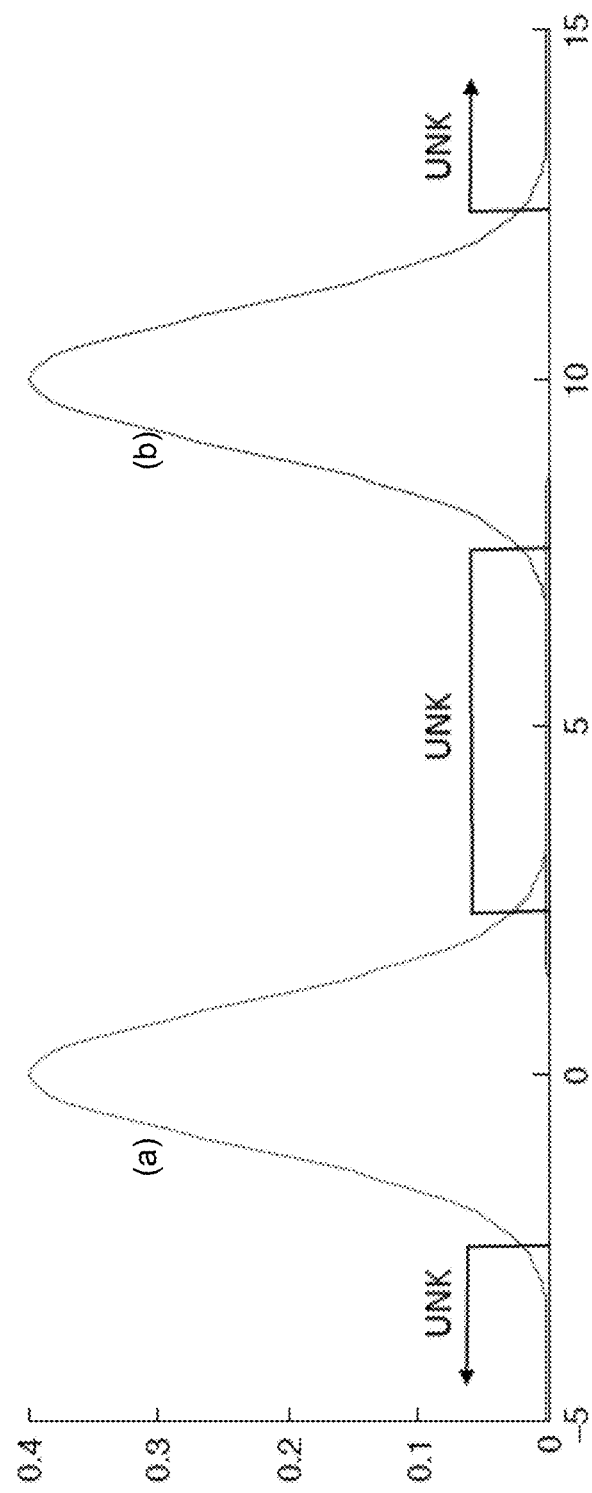
FIG. 8 is a graph illustrating an example of a probability distribution for malicious and legitimate communications.

In one embodiment, a probabilistic model that models the probability distributions of malicious and legitimate samples may be used as a classifier. In one example $\theta_M$ and $\theta_L$ are two statistical models of malicious and legitimate communications, respectively, trained from labeled sample sets of feature vectors. A sample $f$ may be classified as malicious if the probability $$p(f|\theta_M) > p(f|\theta_L), \qquad (6)$$

otherwise it is classified as legitimate. The probability distribution of data samples may be trained with well-known density estimation algorithms, for example. It may be useful to bind the probability from below so that once it is less than a threshold $\tau$, labels are not assigned to the sample and it is considered unknown. Low probability regions are places where no legitimate or malicious samples occurred in the training sets, therefore the decision would be highly uncertain. This is demonstrated in FIG. 8, which illustrates an example of probability distributions for (a) legitimate communications and (b) malicious communications. Regions with low probabilities may be considered to have unknown status instead of using a decision rule (e.g., equation (6) above). With increasing amounts of data, a more complex classifier may be used. A clustering algorithm may be used to cluster PCAPs (packet captures) by seeking regions with highest concentration of points in a feature space. The probability distribution of samples in the cluster may be identified as previously described. Once a few samples from an unknown cluster are classified, the same label (malicious/legitimate) may be assigned to all other samples from the cluster.

It is to be understood that the classifier described above is only one example describing use of the final feature vectors and that other classifiers may also be used, without departing from the scope of the embodiments.

As can be observed from the foregoing, the embodiments described herein provide numerous advantages. One or more embodiments may provide a robust hierarchical processing architecture composed of generic statistical feature extraction functions. Certain embodiments provide representation of a set of related proxy logs with discriminative features (fingerprints). Clustering and classification of malicious and legitimate traffic may be based on traffic context as represented by the fingerprints. Representation of a single proxy log may be provided according to its context (e.g., time window of fixed size is centered around proxy log of interest, hierarchical feature extraction of proxy logs in the time window is performed, and the proxy log of interest is represented by the extracted feature vector). Traffic may be compared using fingerprints computed from proxy logs from different time windows. Fingerprints may also be extracted from traffic of sandboxed samples and similar fingerprints may be searched for in real traffic (and vice versa). Certain embodiments may be used to distinguish between different types of malware classes according to malware traffic fingerprints. Also, machine learning approaches trained from labeled samples may be used and labels on previously unseen traffic may be inferred.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving packet flow data comprising proxy logs at a computing device comprising a processor configured to process a feature extraction hierarchy comprising a plurality of feature extraction levels and a set of feature extraction functions, each of said feature extraction levels comprising a subset of said feature extraction functions, each of said feature extraction functions used to compute a feature vector;
   computing at the processor, a first set of feature vectors for the packet flow data at a first feature extraction level of the feature extraction hierarchy using proxy log attributes;
   inputting said first set of feature vectors computed from said first feature extraction level of the feature extraction hierarchy into a second feature extraction level of the feature extraction hierarchy at the processor, to compute a second set of feature vectors using a combination of results from said first feature extraction level; and
   transmitting a final feature vector representing a fingerprint of the proxy logs to a classifier for use by the classifier to differentiate malicious traffic from legitimate traffic and identify the malicious traffic;
   wherein each of said first and second feature extraction levels of the feature extraction hierarchy comprises said subset of feature extraction functions chosen for said feature extraction level from said set of feature extraction functions and builds feature vectors representing traffic behavior; and
   wherein the feature extraction hierarchy allows for combination and aggregation of said feature extraction functions to provide an output of features to represent said traffic behavior and capture contextual information from related proxy log fields.

2. The method of claim 1 wherein the packet flow data comprises logs collected in a specified time window.

3. The method of claim 2 further comprising defining a vector of attributes representing one of the logs.

4. The method of claim 2 further comprising defining a matrix representing all of the logs.

5. The method of claim 1 wherein said final feature vector comprises a single feature vector representing traffic of all users in a specified time window.

6. The method of claim 1 further comprising:
   constructing matrices representing traffic for a set of flows in a specified time window;
   constructing a first data matrix for said first set of feature vectors using said matrices to represent a first attribute for the set of flows;
   constructing a second data matrix for said second set of feature vectors using said first data matrix to represent a second attribute for the set of flows; and generating said final feature vector based on a last data matrix.

7. The method of claim 1 wherein the classifier is configured to model a probability distribution of malicious and legitimate samples.

8. The method of claim 1 wherein said features comprise statistical features computed from HTTP (Hyper Text Transfer Protocol) traffic to represent traffic behavior.

9. An apparatus comprising:
a linecard configured to receive packet flow data comprising proxy logs:
a processor comprising a feature extraction hierarchy comprising a plurality of levels and a set of feature extraction functions, each of said levels comprising a subset of said feature extraction functions, each of said feature extraction functions used to compute a feature vector, and configured to compute a first set of feature vectors for the packet flow data at a first level of the feature extraction hierarchy using proxy log attributes, input said first set of feature vectors from said first level of the feature extraction hierarchy into a second level of the feature extraction hierarchy to compute a second set of feature vectors using a combination of results from said first level of the feature extraction hierarchy, and input a final feature vector representing a fingerprint of the proxy logs to a classifier to identify malicious traffic; and
memory for storing the packet flow data;
wherein each of said first and second levels of the feature extraction hierarchy comprises said subset of feature extraction functions chosen for said level from said set of feature extraction functions and builds feature vectors representing traffic behavior; and
wherein the feature extraction hierarchy allows for combination and aggregation of said feature extraction functions to provide an output of features to represent said traffic behavior and capture contextual information from related proxy log fields.

10. The apparatus of claim 9 wherein the packet flow data comprises logs collected in a specified time window.

11. The apparatus of claim 10 wherein the processor is further configured to define a vector of attributes representing one of the logs.

12. The apparatus of claim 10 wherein the processor is further configured to define a matrix representing all of the logs.

13. The apparatus of claim 9 wherein said final feature comprises a single feature vector representing traffic of all users in a specified time window.

14. The apparatus of claim 9 wherein the processor is further configured to:
construct matrices representing traffic for a set of flows in a specified time window;
construct a first data matrix for said first set of feature vectors using said matrices to represent a first attribute for the set of flows;
construct a second data matrix for said second set of feature vectors using said first data matrix to represent a second attribute for the set of flows; and
generate said final feature vector based on a last data matrix.

15. The apparatus of claim 9 wherein the classifier is configured to model a probability distribution of malicious and legitimate samples.

16. The apparatus of claim 9 wherein said features comprise statistical features computed from HTTP (Hyper Text Transfer Protocol) traffic to represent traffic behavior.

17. Logic encoded on one or more non-transitory computer readable media for execution and when executed operable to:
process packet flow data comprising proxy logs at a feature extraction hierarchy comprising a plurality of levels and a set of feature extraction functions, each of said levels comprising a subset of said feature extraction functions, each of said feature extraction functions used to compute a feature vector;
compute a first set of feature vectors for the packet flow data at a first level of the feature extraction hierarchy;
input said first set of feature vectors computed from said first level of the feature extraction hierarchy into a second level of the feature extraction hierarchy to compute a second set of feature vectors using a combination of results from said first level; and
transmit a final feature vector representing a fingerprint of the proxy logs to a classifier to identify malicious traffic;
wherein each of said first and second levels of the feature extraction hierarchy comprises said subset of feature extraction functions chosen for said level from said set of feature extraction functions and builds feature vectors representing traffic behavior; and
wherein the feature extraction hierarchy allows for combination and aggregation of said feature extraction functions to provide an output of features to represent said traffic behavior and capture contextual information from related proxy log fields.

18. The logic of claim 17 wherein the packet flow data comprises logs collected in a specified time window and further comprising defining a matrix comprising vectors of attributes for each of the logs.

19. The logic of claim 17 wherein said final feature comprises a single feature vector representing traffic of all users in a specified time window.

20. The logic of claim 17 further operable to:
construct matrices representing traffic for a set of flows in a specified time window;
construct a first data matrix for said first set of feature vectors using said matrices to represent a first attribute for the set of flows;
construct a second data matrix for said second set of features using said first data matrix to represent a second attribute for the set of flows; and
generate said final feature vector based on a last data matrix.

\* \* \* \* \*